United States Patent
Melton et al.

(10) Patent No.: US 7,467,943 B2
(45) Date of Patent: Dec. 23, 2008

(54) METHOD FOR COMBUSTING FUEL IN A FIRED HEATER

(75) Inventors: M. Shannon Melton, Tulsa, OK (US); Donald F. Zetik, Sr., Tulsa, OK (US); Dan P. Loveless, Collinsville, OK (US); Frank W. Pickell, Friendswood, TX (US); John Z. Varesic, Tiki Island, TX (US); John H. Brinly, Montgomery, TX (US); Gary M. Scoggin, Texas City, TX (US)

(73) Assignee: BP Corporation North America Inc., Warrenville, IL (US)

(*) Notice: Subject to any disclaimer, the term of this patent is extended or adjusted under 35 U.S.C. 154(b) by 276 days.

(21) Appl. No.: 10/545,253

(22) PCT Filed: Feb. 18, 2004

(86) PCT No.: PCT/US2004/004923

§ 371 (c)(1),
(2), (4) Date: Apr. 17, 2006

(87) PCT Pub. No.: WO2004/081446

PCT Pub. Date: Sep. 23, 2004

(65) Prior Publication Data

US 2006/0234172 A1    Oct. 19, 2006

(51) Int. Cl.
F23M 3/00    (2006.01)
(52) U.S. Cl. .............................. 431/9; 431/10
(58) Field of Classification Search .................... 431/9, 431/10, 11, 12, 115, 116
See application file for complete search history.

(56) References Cited

U.S. PATENT DOCUMENTS

| 4,030,874 | A | * | 6/1977 | Vollerin | 431/9 |
| 5,154,599 | A | * | 10/1992 | Wunning | 431/215 |
| 5,790,420 | A | * | 8/1998 | Lang | 700/287 |

* cited by examiner

*Primary Examiner*—Alfred Basichas
(74) *Attorney, Agent, or Firm*—Patrick Kim; Ekkehard Schoettle

(57) ABSTRACT

A method for combusting fuel in a fired heater having one or more burners, the method. comprising: (a) combusting at least a portion of the fuel in the. presence of an oxidizer in the burners,. generating heat and producing a flue gas; and (b) recycling at least a portion. of the flue gas to. the burners;. wherein step (a) and step (b) are conducted in a manner such that the combusting takes place in a combustion regime represented. by $4{,}500 - 7554.8 - 933.72x + 64.960x^2 + 0.47705y - 0.55680z^{1579} \cdot 22{,}500$; W wherein w represents a mole fraction of oxygen. in the oxidizer, x represents a recycle ratio of the flue as measured in moles of flue gas/mole of oxidizer; wherein y represents a temperature of the. flue gas in Fahrenheit recycled to the burners; and wherein. z represents a heating. value of the fuel in Btu/scf LHV.

19 Claims, 2 Drawing Sheets

METHOD FOR COMBUSTING FUEL IN A FIRED HEATER

FIELD OF INVENTION

The present invention relates to a method for combusting fuel and more particularly to a method for combusting fuel in fired heaters in the presence of substantially pure oxygen and recycled flue gas.

BACKGROUND OF THE INVENTION

Current and future environmental regulations necessitate design and operation changes to existing and new fired heaters and boilers used in many industrial processes, including the refining of petroleum. Conventional fired heaters, as traditionally operated, produce flue gases comprising water vapor ($H_2O$), carbon dioxide ($CO_2$), unburned fuel, nitrogen oxides ($NO_x$), sulfur oxides ($SO_x$) and nitrogen ($N_2$). Of these exhaust gases, carbon monoxide (CO), unburned fuel, nitrogen oxides ($NO_x$), and sulfur oxides ($SO_x$) are objectionable environmental pollutants and/or health hazards.

More particularly, CO is an odorless toxic gas that causes a variety of physical ailments, including headaches, nausea, unconsciousness and, ultimately, death, upon prolonged exposure. $NO_x$, which comprises NO, $N_2O_3$ and $NO_3$, reacts with hydrocarbons in the presence of oxygen and sunlight to form a photochemical smog contributing to the "Green House" effect in the Earth's atmosphere. Unburned hydrocarbons also contribute to smog and the "Green House" effect in the Earth's atmosphere. $SO_x$, which comprises $SO_2$ or $SO_3$, produces acid rain and is toxic.

In light of these harmful pollutants and environmental regulations, control of the pollutants has become a primary design parameter for fired heaters and other fuel combustion devices. However, heater design has not evolved to the level that satisfies environmental and health concerns while also satisfying the economic and technical practicalities of operating fired heaters.

Of particular and recent concern in heater design is the reduction of $NO_x$. $NO_x$ reduction may be accomplished through the elimination of $N_2$ as an oxidant during combustion processes. However, $N_2$ is the major component of air, which provides the oxygen necessary for the combustion of hydrocarbons. Consequently, some of these efforts have suggested using pure oxygen in lieu of air to remove $N_2$ from the combustion process.

Although using pure oxygen greatly reduces the presence of $N_2$ during the combustion process, the use of pure oxygen presents additional problems not associated with the use of air to combust fuel. Using pure oxygen in a conventional fired heater results in elevated radiant section temperatures due to the absence of $N_2$, which removes heat from the radiant section of fired heaters. Such elevated temperatures pose substantial safety and environmental risks including, but not limited to, heater material failure. Additionally, elevated temperatures may cause degradation of hydrocarbon process fluids that are heated in the tubes of the radiant section of the heater resulting in coking and unit downtime for many chemical and refining processes. If the fuel contains nitrogen or nitrogen enters the heater from the ambient air, these elevated temperatures also pose the environmental hazard of converting excessive quantities of the nitrogen to $NO_x$. Additionally, the presence of the nitrogen may cause a reduction of fired heater efficiency, therefore requiring increased fuel consumption and increased $CO_2$ emissions to the atmosphere.

Consequently, to moderate the radiant section temperature, some publications have suggested recycling combustion exhaust gases to the combustion process, alleviating the need for $N_2$ as a temperature moderator. Wilkinson et al., *$CO_2$ Capture via Oxyfuel Firing: Optimisation of a Retrofit Design Concept for a Refinery Power Station Boiler*, First National Conf. on Carbon Sequestration (May 2001), discloses a method for capturing $CO_2$ from boilers for heating water by combusting fuel with pure oxygen and a flue gas recycle stream. Although the Wilkinson disclosure advances the art, the Wilkinson boiler is limited to boiler design and does not address critical design and operational aspects of heating hydrocarbon process fluids while reducing $NO_x$ emissions.

Additionally, the Wilkinson publication and similar efforts have not been widely commercialized, and attempts to design and commercialize such, efforts have revealed potentially catastrophic problems and challenges. For example, high temperatures due to rapid oxidation of fuels can be catastrophic in the absence of large quantities of nitrogen to remove heat from the radiant section of conventional fired heaters. In flue gas recycle designs, changes in fuel heat content or flue gas heat capacity can create dangerous conditions that are not realized until they are fully involved, which may jeopardize safe and economical operation of the fired heater.

We have now found that combusting fuel in a fired heater in the presence of pure oxygen within a combustion regime represented by $$4{,}500 \geq 7554.8 - 933.72x + 64.960x^2 + .47705y - .55680z - \frac{1579.2}{w} \geq 2{,}500,$$

wherein w is the mole percent of oxygen in the oxidizer, x is the recycle ratio of the flue gas as measured in moles of recycle flue gas/mole of oxidizer, y is the temperature (° F.) of the flue gas injected into the radiant section of the fired heater, and z is the heating value of fuel in the combustion process, as measured in Btu/scf LHV, results in unprecedented safe and environmentally sound operation of a fired heater.

We have also found that combusting fuel in the presence of substantially pure oxygen while recycling flue gases in a fired heater such that the radiant section of the heater operates at a pressure greater than ambient pressure results in substantially zero $NO_x$ produced from ambient air infiltration while maintaining safe and efficient operation.

We have also found that continuous online monitoring of the fuel composition, flue gas temperature and flue gas recycle rate allows for rapid and accurate control of fuel combustion in a fired heater within the combustion regime represented by $$4{,}500 \geq 7554.8 - 933.72x + 64.960x^2 + .47705y - .55680z - \frac{1579.2}{w} \geq 2{,}500,$$

resulting in unprecedented safe and environmentally desirable operation of a fired heater.

SUMMARY OF THE INVENTION

The present invention is directed to a method for combusting fuel in a fired heater having one or more burners, a flue gas stack section, and a flue gas recycle stream. The method comprises the steps of combusting at least a portion of the fuel in the presence of an oxidizer in the burners, producing a flue gas and recycling at least a portion of the flue gas to the burners, wherein the combustion process has a combustion regime represented by $$4,500 \geq 7554.8 - 933.72x + 64.960x^2 + .47705y - .55680z - \frac{1579.2}{w} \geq 2,500,$$

and wherein w is the mole fraction of oxygen in the oxidizer, x is the recycle ratio of the flue gas recycled to the burners, as measured in moles of flue gas/mole of oxidizer, y is the temperature in Fahrenheit of the flue gas recycled to the burners, and z is the lower heating value of the fuel in Btu/scf.

In another embodiment, the present invention is directed to a method for operating a fired heater having a radiant section wherein the method comprises the steps of combusting a fuel in the presence of substantially pure oxygen in one or more burners of the fired heater, producing a flue gas and recycling at least a portion of the flue gas to the one or more burners, wherein the radiant section operates at a pressure greater than the ambient pressure.

In yet another embodiment, the present invention is directed to a method for monitoring and controlling the combustion of a fired heater comprising a fuel feed stream, an oxygen feed stream and a recycle feed stream, the method comprising the steps of monitoring the fuel stream, producing data representative of heating value z of the fuel, feeding at least a portion of the fuel to the fired heater, combusting the fuel in the presence of the substantially pure oxygen in one or more burners of the fired heater producing a flue gas having a temperature y in degrees. Farenheit, recycling at least a portion of the flue gas into the oxygen feed stream producing an oxygen and flue gas mixture, and thereafter feeding the mixture to the fired heater, wherein the fuel, substantially pure oxygen and flue gas are fed into the fired heater in stoichiometric amounts to maintain a combustion regime represented by $$4,500 \geq 7554.8 - 933.72x + 64.960x^2 + .47705y - .55680z - \frac{1579.2}{w} \geq 2,500.$$

The present invention provides for substantial cost-savings during the operation of a fired heater, such as reducing unnecessary consumption of expensive oxygen and fuel.

The present invention provides for substantial safety benefits to person and property by avoiding dangerous operating conditions, which can result in the discharge of toxic pollutants into the atmosphere.

The present invention provides for substantial safety benefits to person and property by avoiding dangerous operating conditions that can result in material failure of the fired heater.

The present invention also provides for a simple design option for the combustion of fuel in an oxygen-only fired heater, facilitating retrofitting of existing fired heaters utilized throughout industry.

DESCRIPTION OF THE PREFERRED EMBODIMENT(S)

Figure 1:
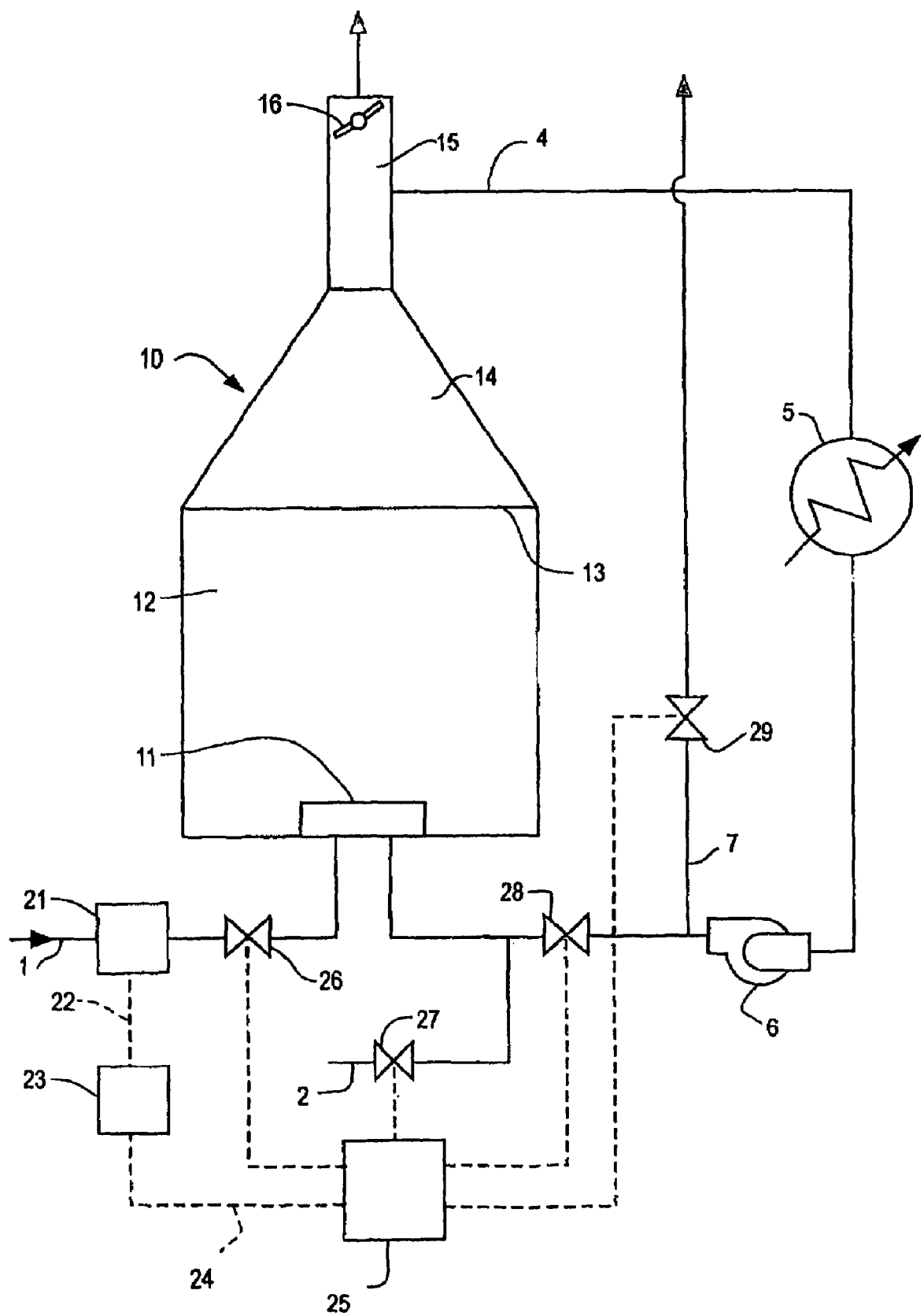
FIG. 1 is an embodiment of a process in accordance with the present invention including methods for continuous monitoring and control of the subject invention.

In greater detail, fuels suitable for the subject invention include, but are not limited to, natural gas, refinery fuel gas, or any liquid or gas fuel suitable for combustion in fired heaters. However, for the purposes of the subject invention, it is preferred to identify suitable fuels by their heating values, which are typically expressed in Btu/scf for gaseous fuels and Btu/lb for liquid fuels. The gas fuels suitable for the subject invention will typically have a lower heating value (LHV) from about 100 Btu/scf LHV to about 2,200 Btu/scf LHV. However, it is preferred that the subject invention employs fuels having a heating value ranging from about 300 Btu/scf LHV to about 1,200 Btu/scf LHV, and most preferably from about 300 Btu/scf LHV to about 900 Btu/scf LHV for best results. The liquid fuels suitable for the subject invention will typically have a heating value from about 17,450 Btu/lb LHV to about 18,200 Btu/lb LHV. However, it is preferred that liquid fuels suitable for the subject invention have a heating value from about 18,100 Btu/lb LHV to about 18,170 Btu/lb LHV, for best results.

The oxidizer suitable for the subject invention can be oxygen-enriched air or substantially pure oxygen. The oxygen-enriched air may comprise between about 30 to about 94 mole percent oxygen (about 0.300 to about 0.940 mole fraction oxygen) with the balance being nitrogen and possibly other trace elements, including, but not limited to argon and carbon dioxide. It is preferred that the oxygen-enriched air comprises at least 40 mole percent oxygen (at least 0.400 mole fraction oxygen), more preferably at least 50 mole percent oxygen (at least 0.500 mole fraction oxygen), and even more preferably at least 80 mole percent oxygen (at least 0.800 mole fraction oxygen) with the balance being nitrogen and possibly other trace elements. Although oxygen-enriched air may be used as the oxidizer, it is highly preferred to use substantially pure oxygen as the oxidizer in order to prevent excess nitrogen from being introduced into the combustion process. The substantially pure oxygen suitable as an oxidizer for the subject invention preferably has an oxygen purity of at least 95 mole percent (at least 0.950 mole fraction oxygen), more preferably of at least 97 mole percent (at least 0.970 mole fraction oxygen), and most preferably at least 99.5 mole percent (at least 0.995 mole fraction oxygen) for best results.

A potential penalty associated with using substantially pure oxygen during the combustion process is a much higher adiabatic flame temperature, which may result in material failure of the fired heater and/or coking of the radiant section tubes. Additionally, excessive adiabatic flame temperature and radiant section temperatures may result in excessive thermal NOx production. Accordingly it is preferred that the adiabatic flame temperature ranges from about 2,500° F. to about 4,000° F., more preferably from about 2,500° F. to about 3,500° F., and most preferably, from about 3,000° F. to about 3,500° F., for best results. It is preferred that the radiant section temperature ranges from about 1,100° F. to about 2,200° F., and most preferably from about 1,300° F. to about 1,800° F. for best results.

The volatility in adiabatic flame temperature is often due to the absence of nitrogen that accompanies oxygen in air. Nitrogen conveniently absorbs heat from the combustion process, moderating the radiant section temperatures. Because of the absence of air-derived nitrogen during the combustion process, it is preferred that the subject invention recycles combustion flue gases to moderate these conditions during the combustion process.

The recycled flue gas suitable for the subject invention is the flue gases produced during the combustion of fuel in the fired heater. Flue gases produced during typical operation of fired heaters may comprise water vapor, carbon dioxide, unburned fuel, nitrogen oxides, sulfur oxides, excess oxygen and nitrogen. Depending upon the fuel used and other combustion conditions, the flue gas composition and the amounts of the individual components thereof may vary dramatically. For instance, the flue gas produced from combusting fuel in accordance with the subject invention will primarily comprise water and carbon dioxide with little or no objectionable pollutants, such as unburned fuel and/or nitrogen oxides.

The fired heaters suitable for the subject invention typically comprise a radiant section having one or more burners and radiant section tubes that contain hydrocarbon process fluids, a convection section, and a flue gas stack section having at least one damper to assist in controlling the draft in the heater and/or directing the flow of the flue gas. Fuel combustion typically takes place in one or more burners producing a flue gas that may be discharged into the atmosphere and/or recycled into the combustion process.

During the combustion process, the fuel and oxidizer are typically injected into one or more burners. The oxidizer is preferably mixed with the recycled flue gas prior to its injection into the one or more burners. However, the oxidizer may be injected directly into one or more burners, into the fuel prior to injecting the fuel into one or more burners or directly into the radiant section of the heater. It is also preferred to inject the oxidizer into the combustion process in quantities over stoichiometric oxygen requirements to insure substantially complete combustion of the fuel so that the flue gas comprises at least about one mole percent oxygen and preferably at least about three mole percent oxygen, resulting in substantially zero unburned hydrocarbons and CO being discharged into the atmosphere. The combustion of the fuel takes place in the presence of the oxidizer and recycled flue gas in one or more burners or the radiant section of the heater.

Additionally, the combustion of the fuel can be conducted in such a manner to eliminate the infiltration of tramp air from outside the fired heater, thereby reducing unnecessary $NO_x$ production from the nitrogen present in air. It is generally preferred that the heater shell is sealed. In another embodiment, the heater may be operated such that the pressure of the radiant section is greater than the ambient pressure. When operating the heater such that the radiant section of the heater has a pressure greater than the ambient pressure, it is preferred that the pressure of the radiant section of the heater is at least about 0.05" of $H_2O$, more preferably at least about 0.075" of $H_2O$, and most preferably at least about 0.10" of $H_2O$ for best results. It is also preferred that the pressure of the radiant section of the heater is not greater than about 0.25" of $H_2O$, more preferably not greater than about 0.20" of $H_2O$. It is also preferred that the pressure of the radiant section of the heater ranges from about 0.05" of $H_2O$ to about 0.10" of $H_2O$, and most preferably from about 0.05" of $H_2O$ to about 0.075" of $H_2O$ for best results. When combusting fuel in this manner it is preferred to assist the injection of the combustion oxidizer and/or recycled flue gas with forced induction. This forced induction along with damper control allows for maintaining the pressure of the radiant section at a pressure greater than ambient pressure.

The combustion of the fuel in a fired heater as described herein primarily serves the purpose of heating hydrocarbon process fluids for a variety of refinery and/or petrochemical processes. In the case of refinery processes, fired heaters are widely used to heat hydrocarbons in a variety of services, for example, catalytic reforming, isomerization, hydroprocessing, olefins manufacture, crude oil feed to an atmospheric tower, crude residuum from the atmospheric tower for feed to a vacuum tower, and the like. Perhaps the most severe service is the heating of feedstock to a delayed coker. While coke deposition can be a problem in any refinery or petrochemical process furnace, because of the high temperatures employed and the residual nature of the coker feedstock, there is a pronounced tendency for the formation of coke deposits on the inside wall of the radiant tubing. Regardless of service, the formation of coke deposits is not desirable. Coke deposits can lead to increased pressure in the tubes due to the restriction of flow, and to higher tube wall temperatures due to the insulative effects of the coke deposits. Both higher process side pressure and temperature lead to premature failure of the tubes. Furthermore, it is often necessary to periodically remove the tube from service and remove the coke deposits by burning off the deposited coke by oxidation with air or another oxidant that is passed through the tube at a high temperature. This periodic burn-off can result in severe thermal cycling, which also reduces the life of the tube.

One factor that has been identified as contributing to high coke formation rates and high tube metal temperatures is the presence of heat flux imbalances. Heat-flux imbalances can be caused by many factors, including, but not limited to, furnace design and furnace operating conditions, such as flame shape, adiabatic flame temperature, insufficient oxygen to burners and fuel gas composition.

In the case of water heating boilers, heat-flux imbalances is not a significant problem because boilers do not suffer the threat of coke formation on the inside wall of the radiant section tubing. For fired heaters that heat hydrocarbon process fluids heat flux imbalances are a significant problem. Therefore, it is favorable to maintain fired heater flux rates for fired heaters that heat hydrocarbon process fluids from about 10,000 Btu/hr/sq ft to about 12,000 Btu/hr/sq ft to prevent coke formation on the inside wall of the radiant tubing. Boilers, on the other hand, heat water, and therefore can have flux rates that are typically from about 25,000 Btu/hr/sq ft to about 50,000 Btu/hr/sq ft. As a result, boilers and heaters have separate operating regimes due to differences in the substances each are designed to heat. Accordingly, the subject invention of operating a fired heater within the combustion regime as described herein specifically contemplates the heating of hydrocarbon process fluids and solves the problem, among other problems, of heated hydrocarbon process fluid degradation and unnecessary coke formation in radiant section tubes resulting from excessive flux rates.

The subject invention contemplates a relationship between the flue gas, the oxidizer, the fuel, and a numerical combustion regime ("the combustion regime") to achieve beneficial results as herein described, and is characterized with the aid of a mathematical equation or model which correlates the combustion regime as a function of the recycle ratio of the flue gas, the mole fraction of oxygen in the oxidizer, the temperature of the flue gas and the heating value of the fuel. Operating a fired heater within the combustion regime as described herein allows for safe, economical and environmentally sound combustion of the fuel in the fired heater.

The mathematical model representing the combustion regime is preferably $$4{,}500 \geq 7554.8 - 933.72x + 64.960x^2 + .47705y - .55680z - \frac{1579.2}{w} \geq 2{,}500,$$

wherein w is the mole fraction of oxygen in the oxidizer, x is the recycle ratio of the flue gas in moles flue gas/mole of oxidizer, y is the temperature in Fahrenheit of the flue gas as it is injected into the combustion process, and z is the heating value of the fuel in Btu/scf LHV. In one embodiment, the combustion regime is represented by $$4{,}000 \geq 7554.8 - 933.72x + 64.960x^2 + .47705y - .55680z - \frac{1579.2}{w} \geq 3{,}000.$$

In another embodiment, the combustion regime is represented by $$3{,}500 \geq 7554.8 - 933.72x + 64.960x^2 + .47705y - .55680z - \frac{1579.2}{w} \geq 2{,}500.$$

In yet another embodiment, the combustion regime is represented by $$3{,}500 \geq 7554.8 - 933.72x + 64.960x^2 + .47705y - .55680z - \frac{1579.2}{w} \geq 3{,}000.$$

In addition to operating the fired heater within the numerical range representative of the combustion regime, it is also important to consider the individual impact each combustion variable can have on the operating conditions of the fired heater. For instance, changes in the fuel heating value and/or excessive flue gas recycling may jeopardize continuous combustion and flame stability within the fired heater. Reducing the mole fraction of oxygen in the oxidizer may result in increased NOx production and/or reduced efficiency of the fired heater. Insufficient flue gas recycling and/or excessive recycled flue gas temperatures may result in excessive adiabatic flame and radiant section temperatures.

Consequently, it is preferred that the oxidizer has a mole fraction of at least 0.800 oxygen (at least 80 percent oxygen), and more preferably at least 0.900 oxygen (at least 90 percent oxygen). It is also preferred that the mole fraction of oxygen w in the oxidizer ranges from about 0.800 oxygen to about 0.995 oxygen (from about 80 percent oxygen to about 99.5 percent oxygen), more preferably from about 0.900 oxygen to about 0.995 oxygen (from about 90 percent oxygen to about 99.5 percent oxygen), and most preferably from about 0.950 oxygen to about 0.995 oxygen (from about 95 percent oxygen to about 99.5 percent oxygen) for best results.

It is preferred that the recycle ratio x is at least 1 mole of flue gas/mole of oxidizer, more preferably at least 2.6 moles of flue gas/mole of oxidizer, and more preferably at least 3.6 moles of flue gas/mole of oxidizer. It is also preferred that recycle ratio x is not greater than 11 moles of flue gas/mole of oxidizer, more preferably not greater than 9 moles of flue gas/mole of oxidizer, and more preferably not greater than 6.0 moles of flue gas/mole of oxidizer. However, it is also preferred that the recycle ratio ranges from about 1.0 moles of flue gas/mole of oxidizer to about 8.0 moles of flue gas/mole of oxidizer, and most preferably from about 2.6 moles of flue gas/mole of oxidizer to about 6.0 moles of flue gas/mole of oxidizer for best results.

It is preferred that the temperature y of the recycled flue gas is not greater than 1,200° F., more preferably not greater than 800° F., and more preferably not greater than 700° F. It is also preferred that the temperature y of the recycled flue gas is at least 300° F. and more preferably at least 400° F. However, it is also preferred that temperature y of the recycled flue gas ranges from about 300° F. to about 1,200° F., more preferably from about 400° F. to about 800° F., and most preferably from about 400° F. to about 700° F. for best results.

It is preferred that the heating value z of the fuel is at least 200. Btu/scf LHV, and more preferably at least 300 Btu/scf. LHV. It is also preferred that the heating value z of the fuel is not greater than 1,600 Btu/scf. LHV, more preferably not greater than 1,200 Btu/scf, and most preferably not greater than 900 BTU/scf LHV for best results. However, it is also preferred that the heating value z of the fuel ranges from about 200 Btu/scf LHV to about 2,200 Btu/scf LHV, and most preferably from about 300 Btu/scf LHV to about 1,600 Btu/scf LHV for best results.

It is relatively straightforward to consider and predict the impact an individual combustion variable may have on the overall combustion of fuel in a fired heater, and thereafter adjust that individual combustion variable accordingly. It becomes increasingly more difficult as additional combustion variables must be considered because typically each combustion variable impacts the other as well as the overall combustion process. Consequently, it is exceedingly problematic to predict the impact each combustion variable may have on each other as well the overall combustion process, and thereafter operate the fired heater in a manner to maintain safe, economical and environmentally sound combustion of the fuel in the fired heater. However, the subject invention solves this problem by defining the relationship between the heating value of the fuel, the temperature and recycle ratio of the flue gas injected into the combustion process, the mole fraction of oxygen in the oxidizer and the numerical combustion regime as defined herein. Through this relationship the subject invention allows for simple operation of the fired heater in accordance with the mathematical model within the defined values of each combustion variable as well as the defined value of the numerical combustion regime.

One of ordinary skill in the art will not only appreciate the individual benefits realized from employing substantially pure oxygen and/or recycling flue gas to the combustion process, but will be surprised at the overall beneficial results achieved by the subject invention. To fully illustrate the breadth of the subject invention as a whole, reference is made to the FIG. 1.

FIG. 1 depicts operation of an fired heater in accordance with the subject invention. As depicted in FIG. 1, heater 10 comprises one or more burners 11, a radiant section 12, a bridgewall 13, a convection section 14, and a flue gas stack section 15. Typical operation of heater 10 begins with the combustion of fuel supplied from fuel feed stream 1 in the presence of substantially pure oxygen supplied from oxygen feed stream 2, producing, a flue gas, which typically flows within heater 10 from radiant section 12 to convection section 14 to flue gas stack section 15. Bridgewall 13 is the point that separates the radiant section 12 from convection section 14, and bridgewall 13 may serve as a measuring point for the temperature and the pressure of the flue gas exiting the radiant section 12.

Flue gas stack section 15 will typically have damper 16 to control the draft in the heater. In addition to controlling the draft in the heater, one or more dampers may be used to direct the flow of the flue gas to the atmosphere and/or to the combustion process as flue gas recycle stream 4. It is preferred that the damper is operated in such a manner to maintain the flow of the flue gas recycle stream 4 directed into the combustion process at a recycle ratio ranging from about 1 mole flue gas/mole of oxidizer to about 8 moles flue gas/mole of oxidizer, and more preferably ranging from about 2.6 moles flue gas/mole of oxidizer to about 6 moles flue gas/mole of oxidizer.

Preferably, the flue gas stack section 15 provides the source of the flue gas recycle stream 4, which is sent to one or more burners 11 or radiant section 15 via flue gas recycle stream 4. However, convection section 14 can also provide the source of flue gas recycle stream 4. Flue gas recycle stream 4 can be located external of the heater, as illustrated in FIG. 1. In any event, it is preferred to measure the flue gas temperature, pressure and/or flow rate in the flue gas stack section 15 and/or the flue gas recycle stream 4.

Typically, the flue gas recycle stream 4 exiting the flue gas stack section 15 is at a temperature ranging from about 500° F. to about 800° F. If the flue recycle stream exceeds 700° F., it is preferred that it undergoes cooling through recycle cooler 5, which can be of any conventional type. If the flue gas recycle stream 4 undergoes recycle cooling through recycle cooler 5, it is preferred that the temperature, pressure and flow rate of flue gas recycle stream 4 are measured downstream of recycle cooler 5. If necessary, the flow rate and pressure of the flue gas recycle stream 4 may be increased or variably controlled by induced draft fan 6 or by any conventional means suitable for this process, including, but not limited to, increased natural draft effect. If flue gas recycle stream 4 has undergone a flow rate and/or pressure change, it is preferred that the temperature and flow rate of flue gas recycle stream 4 are measured downstream of said flow rate and/or pressure change. At least a portion of the flue gas recycle stream 4 may be removed from the process via reject stream 7. The precise amount of the flue gas recycle stream 4 sent to reject stream 7 can be determined as further described herein.

Reject stream 7 primarily consists of innocuous molecules, such as water and carbon dioxide, and is almost completely devoid of particular environmental pollutants. As a result of the combustion process as described herein, reject stream 7 can be discharged into the atmosphere with relatively low environmental impact.

The flue gas recycle stream is preferably mixed with at least a portion of the oxidizer prior to its injection into one or more burners 11. Referring again to FIG. 1, substantially pure oxygen is preferably injected via oxygen feed stream 2 directly into the flue recycle stream 4. However, the substantially pure oxygen may be injected directly into one or more burners 11, into fuel feed 1 or into the radiant section 12 of the heater. The oxygen and flue recycle stream are thereafter preferably injected into one or more burners 11 or the radiant section 12 of the heater for fuel combustion.

The fuel is preferably injected into one or more burners 11 via fuel feed stream 1. However, prior to injecting the fuel into the combustion process, it is preferred that the precise composition of the fuel is determined in order to calculate the heating value of the fuel. It is also preferred to determine flow rate of the fuel feed stream prior to injecting the fuel into the combustion process. Fuel composition determination can be accomplished by way of a chromatograph, a calorimeter or in any other conventional manner. However, it is preferred that the composition of the fuel is continuously analyzed by sending at least a portion of the fuel though a sample cell of a chromatograph 21, thereby continuously producing fuel composition data for subsequent heating value calculations. The heating value of the fuel may also be readily available or directly determined by a calorimeter test without the need for determining the composition of the fuel.

In a preferred embodiment, the subject invention also contemplates a feedforward combustion control system to facilitate continued operation of the fired heater within the combustion regime. As depicted in FIG. 1, the chromatograph 21 is operatively linked to microprocessor 23 via chromatograph output line 22. The chromatograph 21 outputs fuel flow and/or composition data via chromatograph output line 22 to the microprocessor 23. Using the fuel flow and/or composition data, microprocessor 23 can calculate the density, heating value and oxygen demand of the fuel. Microprocessors used for the subject invention may be of any variety available in the art and may be operated singularly or in tandem with one or more microprocessors. Other data, including, but not limited to, flue gas temperature, flue gas composition, flue gas pressure and radiant section temperature, may be input into the microprocessor 23 via additional input devices and input lines. Such input devices may include, but are not limited to, a keyboard for manually inputting data. The microprocessor 23 is programmed to calculate the heating value of the fuel in fuel feed stream 1 based on the fuel composition data obtained from the chromatograph 23. Microprocessor 23 is operatively linked to heater controller 25 via microprocessor output line 24. Microprocessor 23 sends a signal to the heater controller 25 instructing the heater controller 25 to perform one or more instructions.

The heater controller 25 operates a set of flow control valves. As shown in FIG. 1, the flow control valves comprise fuel flow control valve 26, oxygen flow control valve 27, recycle flow control valve 28, and/or reject flow control valve 29. In one embodiment, flow control valves are actuated based on a signal from the microprocessor 23, thereby controlling the degree of flow of fuel feed stream 1, oxygen feed stream 2 and/or flue gas recycle stream 4 injected into one or more burners 11 and/or the degree of flow of the reject stream 7 into the atmosphere. The flow control valves may be actuated in any conventional manner, including, but not limited to pneumatically or hydraulically. Based on output data from the microprocessor 23, the flow of the fuel feed stream 1, oxygen feed stream 2 and/or flue recycle stream 4 is preferably controlled by heater controller 25 to continuously maintain operation of the fired heater within the combustion regime in accordance with the present invention. This feedforward combustion control scheme facilitates operation of the fired heater within the combustion regime that may not otherwise be possible in the event of a significant change in any input combustion condition, such as changes in fuel composition or flow rate, changes in the oxidizer composition or flow rate and/or changes in flue gas recycle ratios.

As a result, the present invention provides for efficient operation of a fired heater by eliminating heat flux imbalances and instable flame patterns, thereby resulting in substantial cost savings through: (1) the elimination of unnecessary fired heater downtime due to the coking of radiant section tubes; and (2) unnecessary consumption of expensive oxygen and fuel.

The present invention also provides for substantial environmental benefits and safety benefits to person and property by avoiding dangerous operating conditions, which could result in: (1) the discharge of environmental and toxic pollutants, such as $NO_x$, CO and unburned hydrocarbons, into the atmosphere; and (2) possible material failure of the fired heater due to excessive radiant section temperatures.

The present invention also provides for a simple design option for the combustion of fuel in a fired heater, facilitating implementation of the subject invention for existing fired heaters utilized throughout the refining and petrochemical industry.

Although the present invention has been described with particularity and detail, the following examples provide further illustration of the invention and are understood to not limit the scope of the invention.

Figure 2:
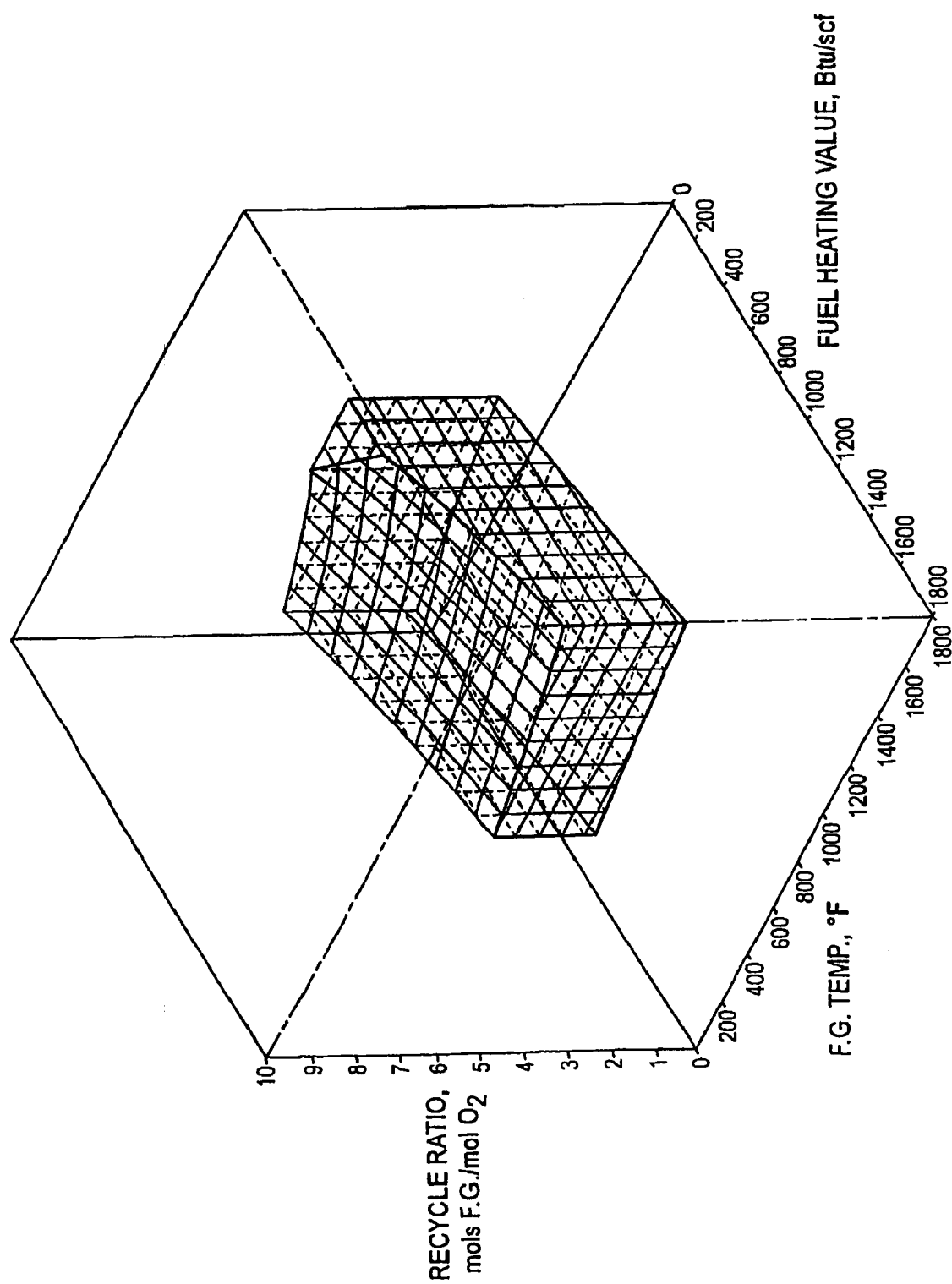
FIG. 2 is a three dimensional plot in accordance with the present invention graphically representing the combustion regime as herein described.

The following examples represent detailed computer simulations of combusting fuel in a sealed fired heater for heating crude oil, operating substantially in accordance with the present invention and FIG. 1. FIG. 2 graphically depicts the combustion regime in accordance with the examples where the mole fraction of oxygen in the oxidizer is 0.995. In conducting the simulations and as illustrated in the following tables, a variety of process parameters that affect the degree of safety, efficiency and environmental impact of combusting fuel in a fired heater were considered during each test run.

EXAMPLE 1

This simulation is conducted in accordance with the mathematical representation, of the combustion regime of $$4,500 \geq 7554.8 - 933.72x + 64.960x^2 + .47705y - .55680z - \frac{1579.2}{w} \geq 2,500.$$

In this simulation, the heating values of the fuel range from 300 Btu/scf LHV to 900 Btu/scf LHV. An oxidizer with a mole fraction of 0.995 oxygen (99.5 percent oxygen) is injected into the combustion process over stoichiometric oxygen requirements so that the flue gas comprises about 3 mole percent oxygen. The flue gas recycle ratios range from 2.901 to 5.285 moles flue gas/mole of oxidizer. The recycled flue gas temperature ranges from 400° F. to 700° F. The exact combustion parameters and results for each test run are set forth in Table 1, wherein f represents a value within the combustion regime.

TABLE 1

| Run | Fuel Heating Value (Btu/scf) | Excessive Oxidizer Fract | O2 in Oxidizer Fract | O2 in Flue Gas (Wet) Fract | Flue Gas Temp. ° F. | Flue Gas Recycle Ratio | f |
|---|---|---|---|---|---|---|---|
| 1 | 300 | .0598 | .995 | .0300 | 400 | 3.562 | 3500 |
| 2 | 300 | .0598 | .995 | .0300 | 400 | 4.120 | 3250 |
| 3 | 300 | .0598 | .995 | .0300 | 400 | 4.793 | 3000 |
| 4 | 300 | .0598 | .995 | .0300 | 700 | 3.855 | 3500 |
| 5 | 300 | .0598 | .995 | .0300 | 700 | 4.496 | 3250 |
| 6 | 300 | .0598 | .995 | .0300 | 700 | 5.285 | 3000 |
| 7 | 900 | .0466 | .995 | .0300 | 400 | 2.901 | 3500 |
| 8 | 900 | .0466 | .995 | .0300 | 400 | 3.340 | 3250 |
| 9 | 900 | .0466 | .995 | .0300 | 400 | 3.870 | 3000 |
| 10 | 900 | .0466 | .995 | .0300 | 700 | 3.141 | 3500 |
| 11 | 900 | .0466 | .995 | .0300 | 700 | 3.647 | 3250 |
| 12 | 900 | .0466 | .995 | .0300 | 700 | 4.269 | 3000 |

In this simulation, it is projected that the flue gas composition for each test run yields substantially zero. $NO_x$, CO, or unburned hydrocarbons in the flue gas. In all instances, the heat flux is projected to be well within the limits of safe and efficient operation of the fired heater, resulting in an expected reduction in the downtime of the fired heater due to material failure and/or coking of the radiant section tubes.

EXAMPLE 2

This simulation is conducted in accordance with the mathematical representation of the combustion regime of $$4,500 \geq 7554.8 - 933.72x + 64.960x^2 + .47705y - .55680z - \frac{1579.2}{w} \geq 2,500.$$

In this simulation, the heating value of the fuel is 700 Btu/scf LHV. An oxidizer comprising 99.5 mole percent oxygen (substantially pure oxygen) is injected into the combustion process over stoichiometric oxygen requirements so that the flue gas comprises about 3 mole percent oxygen. The flue gas is recycled into the combustion process at a rate of 1.0 mole flue gas/mole of oxidizer at a temperature of 700° F. The exact combustion parameters and results for the test run are set forth in Table 2, wherein f represents a value outside the combustion regime.

TABLE 2

| Run | Fuel Heating Value (Btu/scf) | Excessive Oxidizer Fract | O2 in Oxidizer Fract | O2 in Flue Gas (Wet) Fract | Flue Gas Temp. ° F. | Flue Gas Recycle Ratio | f |
|---|---|---|---|---|---|---|---|
| 1 | 900 | .0466 | .995 | .0300 | 700 | 1.0 | 4928 |

In this simulation, it is projected that premature deterioration of the burner and adjacent structure (e.g. refractory lining) will occur from long term exposure to excessive adiabatic flame temperatures. It is also projected that radiant section tubes may ultimately suffer thermal stress ruptures resulting from extensive local overheating or hot spots on the radiant section tubes. In both cases, catastrophic failure of the fired heater may occur resulting in a substantial safety hazard to person and property.

Although embodiments of this invention have been shown and described, it is to be understood that various modifications and substitutions, as well, as rearrangement of parts and equipment, can be made by those skilled in the art without departing from the novel spirit and the scope of this invention.

What is claimed is:

1. A method for combusting fuel in a fired heater having one or more burners, the method comprising:

(a) combusting at least a portion of said fuel in the presence of an oxygen-containing oxidizer in said burners, generating heat and producing a flame and a flue gas; and
(b) recycling at least a portion of said flue gas to said burners;
wherein step (a) and step (b) are conducted in a manner such that combusting takes place in a combustion regime represented by $$4,500 \geq 7554.8 - 933.72x + 64.960x^2 + .47705y - .55680z - \frac{1579.2}{w} \geq 2,500;$$

wherein w represents a mole fraction of oxygen in the oxidizer;
wherein x represents a recycle ratio of said flue gas as measured in moles of flue gas/mole of oxidizer;
wherein y represents a temperature of the flue gas, in Fahrenheit, recycled to said burners; and
wherein z represents a heating value of said fuel in Btu/scf LHV.

2. The method of claim 1, further comprising the step of heating a hydrocarbon process fluid from the heat generated in step (a).

3. The method of claim 2, wherein $1.0 \leq x \leq 8.0$.

4. The method of claim 2, wherein $2.6 \leq x \leq 6.0$.

5. The method of claim 2, wherein said oxidizer is oxygen-enriched air.

6. The method of claim 2, wherein said oxidizer is substantially pure oxygen.

7. The method of claim 1, wherein $1.0 \leq x \leq 8.0$.

8. The method of claim 1, wherein $2.6 \leq x \leq 6.0$.

9. The method of claim 1, wherein said oxidizer is oxygen-enriched air.

10. The method of claim 1, wherein said oxidizer is substantially pure oxygen.

11. A method for combusting fuel in a fired heater having one or more burners, the method comprising:
(a) combusting at least a portion of said fuel in the presence of an oxygen-containing oxidizer in said burners producing a flame and a flue gas; and
(b) recycling at least a portion of said flue gas to said burners;
wherein step (a) and step (b) are conducted in a manner such that combusting takes place in a combustion regime represented by $$4,500 \geq 7554.8 - 933.72x + 64.960x^2 + .47705y - .55680z - \frac{1579.2}{w} \geq 2,500;$$

wherein w represents a mole fraction of oxygen in the oxidizer, wherein $0.900 \leq w \leq 0.995$;
wherein x represents a recycle ratio in moles flue gas/mole of oxidizer, wherein $1.0 \leq x \leq 8.0$;
wherein y represents a temperature, in Fahrenheit, of the flue gas recycled to said burners wherein $300° F. \leq y \leq 1,200° F.$; and
wherein z represents a heating value in Btu/scf LHV of said fuel wherein $100\ Btu/scf \leq z \leq 2,200\ Btu/scf$.

12. The method of claim 11, wherein the upper limit in the equation that represents said combustion regime is 3,500 1579.2.

13. The method of claim 12, wherein the fired heater has a heat flux rate ranging from about 10,000 Btu/hr/sq ft. to about 12,000 Btu/hr/sq ft.

14. The method of claim 11, wherein the fired heater has a heat flux rate ranging from about 10,000 Btu/hr/sq ft. to about 12,000 Btu/hr/sq ft.

15. A method for monitoring and controlling the combustion of fuel in a fired heater comprising a fuel feed stream, an oxygen feed stream and a recycle feed stream, the method comprising the steps of:
(a) monitoring said fuel, producing fuel composition data;
(b) feeding at least a portion of said fuel to said fired heater;
(c) combusting said fuel in the presence of substantially pure oxygen in one or more burners of said fired heater producing a flame and a flue gas having a temperature y, as measured in Fahrenheit; and
(d) recycling at least a portion of said flue gas at a recycling ratio x, as measured in moles of flue gas/mole of oxygen, to the fired heater;
wherein said fuel, substantially pure oxygen, and flue gas are fed into said fired heater in at least stoichiometric amounts wherein combusting takes place in a combustion regime represented by $$4,500 \geq 7554.8 - 933.72x + 64.960x^2 + .47705y - .55680z - \frac{1,579.2}{w} \geq 2,500.$$

wherein w represents a mole fraction of oxygen in the oxidizer; and
wherein z represents a heating value of said fuel in Btu/scf LHV.

16. The method of claim 15, wherein said fuel is continuously monitored by a chromatograph.

17. The method of claim 16, wherein said chromatograph is operatively linked to a microprocessor.

18. The method of claim 17, wherein said fuel composition data is sent from said chromatograph to said microprocessor wherein said heating value of said fuel is determined by said microprocessor based on said fuel composition data.

19. The method of claim 18, wherein said microprocessor is operatively linked to a heater controller wherein said heater controller operates a fuel flow control valve, an oxygen flow control valve, and a recycle flow control valve based on one or more signals from the microprocessor, thereby controlling the amount of fuel, substantially pure oxygen and flue gas fed into the fired heater.

* * * * *